United States Patent [19]

Miles

[11] Patent Number: 5,894,854
[45] Date of Patent: Apr. 20, 1999

[54] METHOD FOR STRIPPING PAINT FROM NON-FERROUS SUBSTRATES

[76] Inventor: Samuel Lee Miles, 5246 Aintree, Rochester, Mich. 48306

[21] Appl. No.: 09/195,501

[22] Filed: Nov. 19, 1998

[51] Int. Cl.$^6$ .................................................. B08B 3/04
[52] U.S. Cl. ............................. 134/38; 134/26; 134/29; 134/42; 510/413
[58] Field of Search ............................ 134/26, 29, 38, 134/42; 510/413

[56] References Cited

U.S. PATENT DOCUMENTS 4,673,524  6/1987  Dean ........................................ 252/118
5,712,234  1/1998  Pourreau ................................. 510/174

*Primary Examiner*—Lyle A. Alexander
*Assistant Examiner*—S. Carrillo

[57] ABSTRACT

A method of stripping cured paint from a non-ferrous substrate comprising: a) adding a stripping composition to a strip tank, said stripping composition consisting an alkylphenol-hydroxypolyoxyethlene and triethanolamine; b) immersing said nonferrous substrate in said strip tank containing said stripping composition; and c) heating said stripping composition to 350° F. for approximately 60 minutes, wherein cured paint is removed from said non-ferrous substrate. This method is environmentally safe and will not alter, attack, or stain the non-ferrous substrate.

5 Claims, No Drawings

METHOD FOR STRIPPING PAINT FROM NON-FERROUS SUBSTRATES

FIELD OF THE INVENTION

This invention is an improved composition for removal of cured paint from non-ferrous parts. More specifically, the present invention relates to an environmentally friendly method of cured paint removal with a composition that is 99% free of volatile organic compounds.

BACKGROUND OF THE INVENTION

Automobile, Industrial and Aircraft exterior parts are painted to protect the substrates from corrosion and also to enhance the cosmetic appearance to help market the finished product. Most manufactures that apply paint finishes have a paint defect rate of 5% to as high as 30% of daily production. Many paint finishing manufactures can no longer afford to discard these parts with paint defects, most manufactures will strip the defective parts in a hot paint strip tank and recycle by repainting the parts. Prior art utilized many different compositions and methods for the removal of paint from many different substrates. The present invention offers an environmentally safe composition, with improved methods of stripping paint from non-ferrous substrates. Prior art paint stripping utilized heated, highly caustic, alkaline solutions as demonstrated by Murphy in U.S. Pat. No. 3,766,076 in 1973 and by Sullivan in U.S. Pat. No. 3,980,587 in 1976. The highly caustic paint strip compositions are not suitable or compatible for use to remove paint from non-ferrous metal parts. The caustic solutions will agressively attack most non-ferrous metal substrates such as aluminum, galvanized steel, copper, zinc die cast, chromium, and tin. Chlorinated volatile organic solvents were utilized to strip paint in U.S. Pat. No. 3,574,123 as described by Laugle in 1971. The present art utilizes volatile organic solvents, such as n-methyl 2-pyrrolidone as reported in U.S. Pat. No. 4,120,810 by Palmer in 1978 and glycol phenol ether or ethoxylated furfuryl alcohol in U.S. Pat. No. 4,619,706 as described by Squires, Hundley, Barry and Powell in 1986. The present technologies continue to utilize compositions containing volatile organic solvents which have been proven to attack our environments protective ozone layer.

SUMMARY OF THE INVENTION

The inventor discovered improved methods to chemically strip and remove paint from non-ferrous substrates with an environmentally friendly composition 99% free of volatile organic compounds. It has also been discovered that this method of removing paint from non-ferrous substrates does not adversely attack the soft metal surfaces. The invention will not harm highly polished aluminum surfaces, whereas many solvent containing and silicated compositions will stain polished aluminum surfaces. The invention has demonstrated excellent paint removal performance on many plastic parts that can withstand temperatures of 350 degrees Fahrenheit for 60 minutes. The invention will remove cured paint from ferrous substrates as well as non-ferrous and plated surfaces. The method or process of use requires a vented hot strip tank capable of 350 degrees Fahrenheit with adequate agitation. The invention is used as received, with no water or volatile organic solvent additive. The invention is a unique composition that exhibits 99% free of any volatile organic compounds, a flash point exceeding 400 degrees Fahrenheit, a boiling point exceeding 500 degrees Fahrenheit, a low vapor pressure and is safe for use to strip paint from non-ferrous substrates.

DESCRIPTION OF THE PREFERRED EMBODIMENT

The present methods of paint stripping with a hot strip process involve the use of a very caustic solution normally with volatile organic solvent additives. As earlier discussed it is common knowledge that the highly caustic portion of the prior art technology compositions adversely attacks non-ferrous substrates. It is also common knowledge the volatile organic solvent additive portion of the prior art compositions adversely attack our environmental ozone protective layer.

The composition of this invention consists of;

a, a Nonionic Surfactant, Formula: C35H6401 1, Molecular Weight: 682(Average), Synonyms: An alkylphenolhydroxypolyoxyethylene, CAS #: 127087-87-0, Name: Poly (oxy-1,2-ethanediyl), alpha- (4-nonylphenyl)-omegahydroxy-branched in a range of 20%–80% by weight with between 40%–60% preferred.

b, a Non-Ferrous Metal Safe Alkaline Source: Triethanolamine-99%, Chemical Name: Alkanolamine, Ethanol, 2,2,2,-nitrilotris, CAS #: 102-71-6 in a range of 20%–80% by weight with between 40%–60% prefferred.

In accordance with this invention, it is discovered that at elevated temperatures of 350 degrees Fahrenheit with approximately 60 minutes dwell time, this composition will strip cured paint from non-ferrous substrates, including: Aluminum, Galvanized Steel, Zinc Die Cast, Copper, Brass, most plated surfaces and 350F thermal stable plastics without adversely affecting the parts surface quality.

EXAMPLES

This invention was tested for paint removal with the present automotive and industrial paint technologies. Paint tested was from PPG, BASF and DUPONT. Paint types were high solids enamel, solvent-borne, water-borne, one component clear, two component clear, tinted clear coat, prime coat, flexible and rigid urethanes and adhesion promoting primes.

The invention was observed at 350F, 60 minute immersion dwell time with the following non-ferrous substrates and multiple cured paint mixtures at 3mil paint film build. All paint was removed, parts were evaluated by weight loss and appearance A,B,C;

| Non-Ferrous Substrate | Solvent Borne Clear Coat Mixture % Strip, Wt. Loss Appearance | Solvent Borne High Solids Enamel % Strip, Wt. Loss Appearance | Solvent Urethane % Strip, Wt. Loss Appearance |
|---|---|---|---|
| Aluminum | 100%, 0% Appearance-A | 100%, 0% Appearance-A | 100%, 0% Appearance-A |
| Galvanized | 100%, 0% Appearance-A | 100%, 0% Appearance-A | 100%, 0% Appearance-A |
| Zinc Die Cast | 100%, 0% Apearance-A | 100%, 0% Appearance-A | 100%, 0% Appearance-A |
| Copper | 100%, 0% Appearance-A | 100%, 0% Appearance-A | 100%, 0% Appearance-A |
| Brass | 100%, 0% Appearance-A | 100%, 0% Appearance-A | 100%, 0% Appearance-A |
| Plastic | 100%, 0% Appearance-A | 100%, 0% Appearance-A | 100%, 0% Appearance-A |

What is claimed is:

1. A method of stripping cured paint from a non-ferrous substrate comprising:

a) adding a stripping composition to a strip tank, said stripping composition consisting of a nonionic surfactant and an alkaline reagent, wherein said nonionic surfactant is an alkylphenol-hydroxypolyoxyethlene and said alkaline reagent is triethanolamine;

b) immersing said nonferrous substrate in said strip tank containing said stripping composition; and c) heating said stripping composition to 350° F. for approximately 60 minutes, wherein cured paint is removed from said non-ferrous substrate.

2. The method of claim 1, wherein said alkylphenol-hydroxypolyoxyethlene is in the range of 20–80 percent by weight.

3. The method of claim 1, wherein said triethanolamine is in the-range of 20–80 percent by weight.

4. The method of claim 2, wherein said alkylphenol-hydroxypolyoxyethlene is in the range of 40–60 percent by weight.

5. The method of claim 3, wherein said triethanolamine is in the range of 40–60 percent by weight.

* * * * *